United States Patent
Chen et al.

(10) Patent No.: US 10,817,355 B2
(45) Date of Patent: Oct. 27, 2020

(54) METHOD AND APPARATUS FOR COMMUNICATION BETWEEN WEBPAGE AND OPERATING SYSTEM

(71) Applicant: BEIJING XIAOMI MOBILE SOFTWARE CO., LTD., Beijing (CN)

(72) Inventors: Shun Chen, Beijing (CN); Hongguang Dong, Beijing (CN); Junjie Dong, Beijing (CN)

(73) Assignee: BEIJING XIAOMI MOBILE SOFTWARE CO., LTD., Beijing (CN)

( * ) Notice: Subject to any disclaimer, the term of this patent is extended or adjusted under 35 U.S.C. 154(b) by 0 days.

(21) Appl. No.: 16/365,195

(22) Filed: Mar. 26, 2019

(65) Prior Publication Data

US 2019/0303225 A1    Oct. 3, 2019

(30) Foreign Application Priority Data

Mar. 28, 2018    (CN) .......................... 2018 1 0264830

(51) Int. Cl.
*G06F 3/00*    (2006.01)
*G06F 9/54*    (2006.01)
*G06F 3/0483*    (2013.01)

(52) U.S. Cl.
CPC ............ *G06F 9/546* (2013.01); *G06F 3/0483* (2013.01); *G06F 9/543* (2013.01); *G06F 9/544* (2013.01); *G06F 9/545* (2013.01)

(58) Field of Classification Search
CPC ....................................................... G06F 9/543
USPC .......................................... 715/770; 719/310
See application file for complete search history.

(56) References Cited

U.S. PATENT DOCUMENTS

| | | | |
|---|---|---|---|
| 10,572,126 B2* | 2/2020 | Fitzpatrick | G06F 3/0486 |
| 2005/0066335 A1 | 3/2005 | Aarts | |
| 2010/0281355 A1* | 11/2010 | White | G06Q 30/02 |
| | | | 715/222 |
| 2013/0169976 A1* | 7/2013 | Yamada | G06F 3/1204 |
| | | | 358/1.2 |

(Continued)

OTHER PUBLICATIONS

Chun-Chuan Yang, Design of the Authoring System for SMIL-based Multimedia Presentations. (Year: 2010).*

(Continued)

*Primary Examiner* — Lechi Truong
(74) *Attorney, Agent, or Firm* — Oblon, McClelland, Maier & Neustadt, L.L.P.

(57) ABSTRACT

Provided is an apparatus for communication between a webpage and an operating system. The apparatus includes memory storing a first software for an operating system and a second software for a web browser. The apparatus also includes processing circuitry that executes the first software to provide the operating system including a clipboard and executes the second software to cause the web browser to access a web page. Further, a software (the first software or the second software) executed by the processing circuitry detects a message that is buffered in a clipboard provided by the operating system, and determines whether the message is in a preset format that is indicative of the software executed by the processing circuitry being a destination of the message. The software executed by the processing circuitry then processes the message when the message is in the preset format.

12 Claims, 5 Drawing Sheets

(56) References Cited

U.S. PATENT DOCUMENTS

2015/0160881 A1* 6/2015 Lewis .................... G06F 9/543
                                                    711/103
2016/0078115 A1* 3/2016 Battista, Jr. .............. G06K 9/72
                                                    715/780

OTHER PUBLICATIONS

Extended European Search Report dated Jul. 3, 2019, in Patent Application No. 19164179.4, citing document AA therein, 8 pages.

* cited by examiner

METHOD AND APPARATUS FOR COMMUNICATION BETWEEN WEBPAGE AND OPERATING SYSTEM

CROSS-REFERENCE TO RELATED APPLICATION

This application is based upon and claims priority to Chinese Patent Application 201810264830.3, filed on Mar. 28, 2018, the entire contents of which are incorporated herein by reference.

Technical Field

The present disclosure relates to the field of electronic technology, and particularly to a method and apparatus for communication between webpage and operating system.

Background

With the development of electronic technology and touch screen technology, various terminals have been widely used. Correspondingly, applications on terminals are more and more diverse in variety and function. For example, a browser is a commonly used application.

A user can browse various webpages through the browser. In some cases, for example, a webpage can implement a certain function by calling a system application of the system, a webpage can communicate with an operating system. Currently, a webpage can communicate with an operating system by calling a corresponding interface in the browser.

In the process of implementing the present disclosure, the inventors found that there are at least the following problems.

Based on the processing mode in which the webpage communicates with the operating system, if no corresponding interface is set in the browser used by the user, the webpage cannot communicate with the operating system, thereby causing the webpage to fail to communicate with the operating system.

SUMMARY

Aspects of the disclosure provide methods and apparatuses for communication between a webpage and an operating system. For example, an apparatus includes memory storing a first software for an operating system and a second software for a web browser. The apparatus also includes processing circuitry that executes the first software to provide the operating system including a clipboard and executes the second software to cause the web browser to access a web page. Further, a software (the first software or the second software) executed by the processing circuitry detects a message that is buffered in a clipboard provided by the operating system, and determines whether the message is in a preset format that is indicative of the software executed by the processing circuitry being a destination of the message. The software executed by the processing circuitry then processes the message when the message is in the preset format.

The software executed by the processing circuitry can be the first software that is executed by the processing circuitry to provide the operating system. The software executed by the processing circuitry can be the second software that is executed by the processing circuitry to cause the web browser to access the web page.

In some embodiments, the software executed by the processing circuitry. detects, from the message, a preset sequence that is associated with the software.

In some embodiments, the processing circuitry decodes the message based on a preset decoding mode associated with the software executed by the processing circuitry; and determines the software executed by the processing circuitry being the destination when the message is correctly decoded.

In some examples, the processing circuitry accesses the clipboard according to a preset cycle time to detect messages buffered in the clipboard.

In some examples, the processing circuitry deletes the message from the clipboard after the message has been processed.

In some examples, the software is the first software that provides the operating system, the operating system, in response to a paste command, pastes another message in a different format from the preset format from the clipboard.

It is to be understood that both the foregoing general description and the following detailed description are exemplary and explanatory only and are not restrictive of the present disclosure.

BRIEF DESCRIPTION OF THE DRAWINGS

The drawings herein are incorporated in and constitute a part of this specification of the present disclosure, showing embodiments consistent with the present disclosure, and explaining the principles of the present disclosure together with the description.

The specific aspects of the present disclosure, which have been illustrated by the accompanying drawings described above, will be described in detail below. These accompanying drawings and description are not intended to limit the scope of the present disclosure in any manner, but to explain the concept of the present disclosure to those skilled in the art via referencing specific aspects.

DETAILED DESCRIPTION

Hereinafter, exemplary embodiments will be described in detail. The embodiments are shown in the drawings. In the following description when referring to the drawings, the same numerals in the different drawings denote the same or similar elements unless otherwise indicated. The embodiments described in the following exemplary embodiments are not representative of all embodiments consistent with the present disclosure. Rather, they are merely examples of apparatuses and methods consistent with some aspects of the present disclosure as detailed in the appended claims.

There is provided a method for communication between a webpage and an operating system in an exemplary embodiment of the present disclosure. The method may be applied to a terminal. The terminal may be any terminal having a function of displaying a webpage, such as mobile phones, tablets, PCs, etc. installed with a browser and/or other applications that contain a browser kernel. The terminal may include components such as a processor, a memory, a screen, and the like. The processor may be a CPU (Central Processing Unit) or the like, and may be used to identify a message in a clipboard and process a first message in a special format. The memory may be a RAM (Random Access Memory), a Flash (Flash), etc., and may be used to store received data, data required for processing, data generated during processing, etc., such as messages transmitted by webpages and operating systems, etc. The screen may be a touch screen, may be used to display a webpage, and may also be used to detect touch signals and the like.

Figure 1:
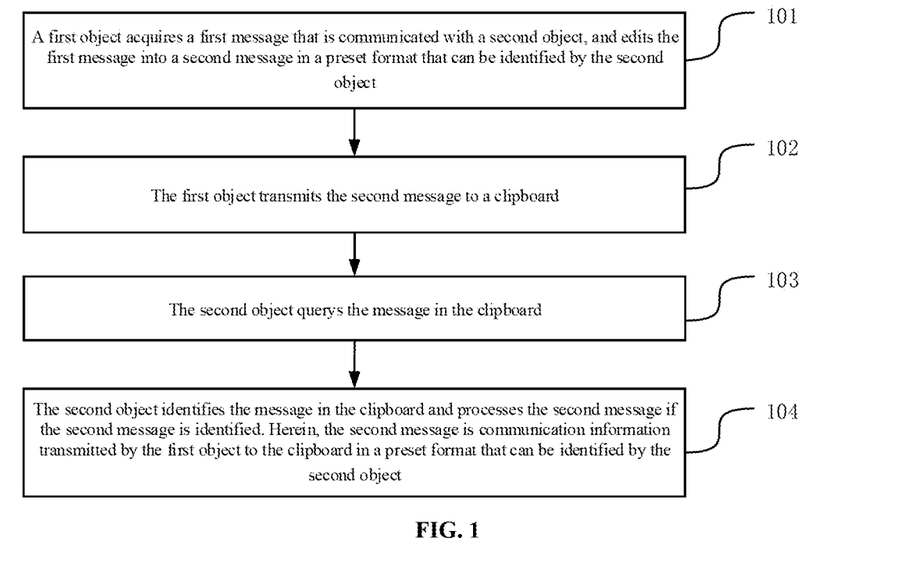
FIG. 1 is a flow chart of a method for communication between a webpage and an operating system according to an exemplary embodiment of the present disclosure.

The processing flow shown in FIG. 1 will be described in detail below with reference to the embodiments as follows.

In step 101, a first object acquires a first message that is communicated with a second object, and edits the first message into a second message in a preset format that can be identified by the second object.

Herein, the first object may be a webpage that needs to communicate with an operating system, or may be an operating system.

In the implementation, during the process of using a terminal, a user can browse various webpages through an application such as a browser. In the process of displaying a webpage by the terminal, the webpage and the operating system can communicate with each other. Exemplarily, when the first object receives an instruction to transmit a message to the second object, a message (which may be referred to as a first message) that is communicated with the second object may be acquired, and then the first message may be edited into a second message in a preset format that can be identified by the second object. For example, when the first object is a webpage and the second object is an operating system, it can be set that the technician can trigger a webpage to generate the second message when a click event of a certain button is detected during design.

Optionally, based on the diversity of the preset format, the processing manner of step 101 may be various, and several feasible processing manners are given below:

In a first manner, a preset sequence is inserted in the first message to acquire the second message in a preset format that can be identified by the second object.

During implementation, after the first object acquires the first message, it can insert the preset sequence into the first message to acquire a second message that can be identified by the second object. Here, the preset sequence (the preset sequence may be 101010) may be inserted to the header of the first message.

In a second manner, the first message is encoded according to a preset encoding mode to acquire the second message in a preset format that can be identified by the second object.

During implementation, the encoding mode (such as Base64 encode) may be pre-stored in the first object. The first object, after acquiring the first message, can encode the first message according to the preset encoding mode to acquire the second message in a preset format that can be identified by the second object. That is, the second message is a message which is encoded by using a preset encoding mode.

In step 102, the first object transmits the second message to a clipboard.

Figure 2:
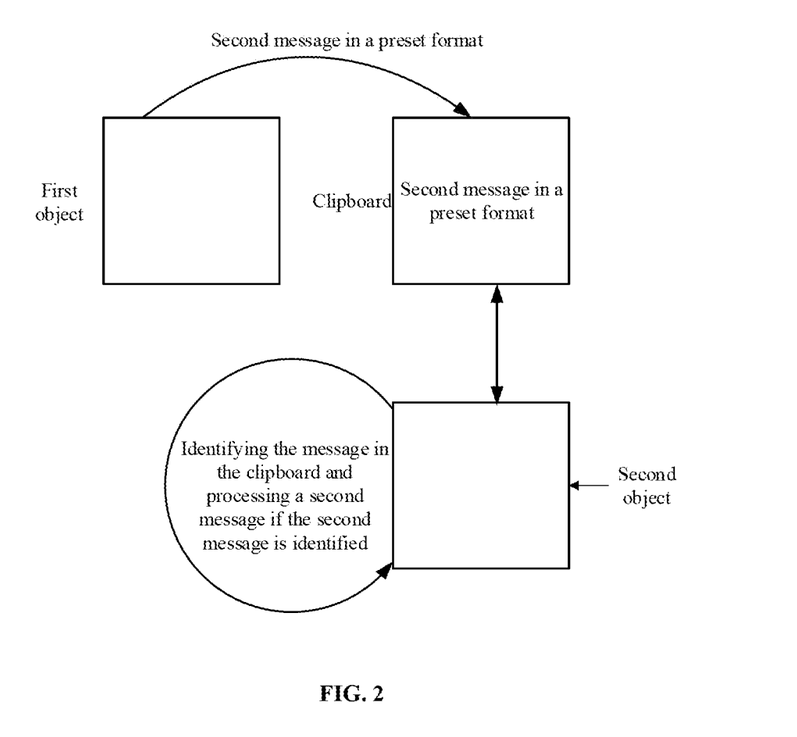
FIG. 2 is a schematic diagram of processing messages according to an exemplary embodiment of the present disclosure.

During implementation, the first object, after acquiring the second message, can transmit the second message in a preset format to a clipboard as shown in FIG. 2. In the case where the second message is acquired through the first method, the first object can transmit the second message inserted with the preset sequence to the clipboard. In the case where the second message is acquired through the second manner, the first object can transmit the second message which has been encoded in the preset encoding mode to the clipboard.

In step 103, the second object queries the message in the clipboard.

During implementation, the second object can query the message in the clipboard.

Optionally, in the case where the first object is an operating system and the second object is a webpage, the message in the clipboard can be periodically queried. Correspondingly, the process of the step 103 can be as follows: querying the message in the clipboard according to a preset query cycle.

During implementation, the webpage may be pre-configured with a mechanism for periodically querying the clipboard, for example, a query period. Herein, the query period may be a relatively small value, so that the webpage may be read a message transmitted by the operating system in a timely manner. The time of processing the message can be reduced. Exemplarily, the webpage can query the clipboard every preset query period, and when it is queried that there is a message in the clipboard, the webpage can identify the message in the clipboard.

In step 104, the second object identifies the message in the clipboard and processes the second message if the second message is identified. Herein, the second message is communication information transmitted by the first object to the clipboard in a preset format that can be identified by the second object.

Herein, the second object is different from the first object. When the first object is a webpage, the second object is an operating system. When the first object is an operating system, the second object is a webpage.

During implementation, after the first object transmits the second message to the clipboard, the second object may detect that there is a message in the clipboard. Herein, the clipboard may further include messages stored in the clipboard when the terminal receives a copy instruction or a cut instruction. Then, the second object can identify the message in the clipboard. If a message in a preset format is correctly identified, it may be further determined whether the message that is identified in a preset format is transmitted by the first object. If it is transmitted by the first object (i.e., if the second object can correctly identify the second message in a preset format), the second message may be processed. For example, the first object is a webpage, the second object is an operating system, and the second message is a message to turn on an imaging component, after the operating system correctly identifies the message to turn on the imaging component, the message may be processed, that is, the imaging component may be turned on. If the second object does not identify any message in a preset format, the second object may not perform message processing. In addition, in this solution, the identification of the message transmitted from the first object to the second object and the identification of the message transmitted from the second object to the first object may be set differently, so that the first object and the second object can distinguish the correctly identified message in a preset format is transmitted from the other party and not to the other party, thus the first object and the second object may process the message transmitted by the other party.

In addition, the clipboard belongs to a system component. After the webpage transmits a second message to the clipboard for communication with the operating system, the operating system can detect that there is a message in the clipboard. That is to say, after the webpage transmits the second message to the clipboard, the operating system can identify the message in the clipboard. For the situation where the user can trigger the terminal to store a message in the clipboard through a cut button or a copy button, the operating system can also detect that there is a message in the clipboard, and then the operating system will also identify that there is a message in the clipboard. In this case, the operating system can identify that the message in the clipboard is not a message in a preset format, that is, the message in the clipboard will not be processed. In this way, by setting the message for communicating between the webpage and the operating system to be a message in a preset format, the message for communicating between the webpage and the operating system may be distinguished from the message cut or copied to the clipboard, so as to avoid misoperation, and avoid to affect the normal functions of cutting, copying and pasting at the same time.

For the situation where the first object transmits the second message to the clipboard in the first manner, the processing of the step 104 may be correspondingly as follows: identifying the message in the clipboard and processing the second message inserted with a preset sequence if the second message is identified.

During implementation, in the situation of the first manner, the second object may identify whether the message in the clipboard contains a preset sequence, and may process the second message inserted with a preset special sequence if the second message is identified, otherwise, may not process the message.

For the situation where the first object transmits the second message to the clipboard in the second manner, the processing of the step 104 may be correspondingly as follows: decoding the message in the clipboard based on a preset decoding mode corresponding to the preset encoding mode and processing the second message if the second message is correctly decoded.

During implementation, in the situation of the second manner, a preset decoding mode corresponding to the preset coding mode may be preset in the second object. When the second object identifies the message in the clipboard, the message in the clipboard may be decoded by using a preset decoding mode. If the second object can correctly decode the second message, then the second object can process the second message, otherwise, the second object does not process the message.

Optionally, after processing the first message, the second object may delete the first message, and accordingly, the following processing may be performed: after processing the second message, the second object deletes the second message from the clipboard.

During implementation, after the second object processes the second message, the second message may be deleted from the clipboard in time. In this way, it is possible to prevent the webpage and the operating system from repeatedly identifying the second message.

Optionally, when the first object or the second object is an operating system, for the situation where the communication between the webpage and the operating system is implemented through the clipboard, when a paste instruction is received, the operating system may judge the message in the clipboard. Accordingly, the processing may be as follows: when receiving a paste instruction, other messages than the message in a preset format in the clipboard are pasted.

During implementation, the clipboard in the terminal can also be used for the user to implement the functions of cutting, copying and pasting. In this case, when the operating system receives a paste instruction, the message in the clipboard may be identified, and other messages than the message in a preset format are determined, and then the other messages determined may be pasted. The message that is newly cut or copied into the clipboard may be pasted, or all messages other than the message in a preset format in the clipboard may be pasted.

In the embodiments of the present disclosure, a first object may acquire a first message that is communicated with a second object, and edit the first message into a second message in a preset format that can be identified by the second object, and further, may transmit the second message to a clipboard. Accordingly, the second object may query and identify the message in the clipboard. If the second message in a preset format and transmitted by the first object is identified, the second message may be processed. Herein, the first object is different from the second object. The first object or the second object may be a webpage or an operating system. In this way, the webpage and the operating system can communicate through the clipboard without calling a corresponding interface in the browser, thereby preventing the failure of communication between the webpage and the operating system.

Figure 3:
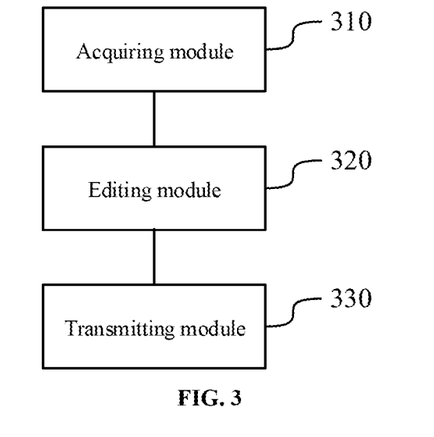
FIG. 3 is a schematic diagram of an apparatus for communication between a webpage and an operating system according to an exemplary embodiment of the present disclosure.

There is provided an apparatus for communication between a webpage and an operating system according to an exemplary embodiment of the present disclosure. The apparatus may be the above-mentioned terminal. As shown in FIG. 3, the apparatus includes:

an acquiring module 310 configured to acquire a first message that is communicated with a second object;

an editing module 320 configured to edit the first message into a second message in a preset format that can be identified by the second object; and a transmitting module 330 configured to transmit the second message to a clipboard so that the second object acquires the second message through the clipboard;

wherein the first object is different from the second object, and the first object and the second object are the webpage or the operating system.

Optionally, the editing module 320 is configured to:

insert a preset sequence in the first message to acquire the second message in a preset format that can be identified by the second object.

Optionally, the editing module 320 is configured to:

encode the first message according to a preset encoding mode to acquire the second message in a preset format that can be identified by the second object.

Figure 4:
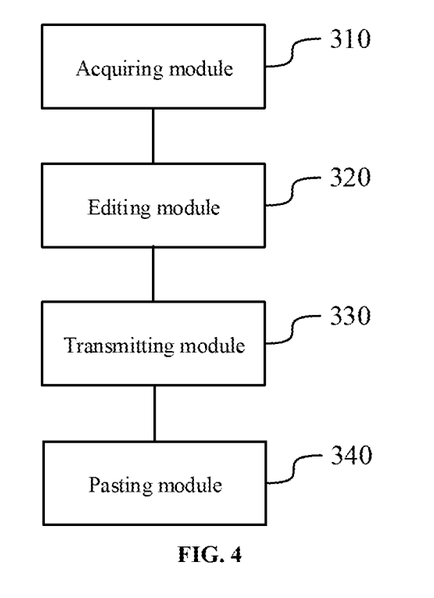
FIG. 4 is a schematic diagram of an apparatus for communication between a webpage and an operating system according to an exemplary embodiment of the present disclosure.

Optionally, as shown in FIG. 4, when the first object is an operating system, the apparatus further comprises:

a pasting module 340 configured to paste a message other than the message in a preset format in the clipboard upon receiving a paste command.

Figure 5:
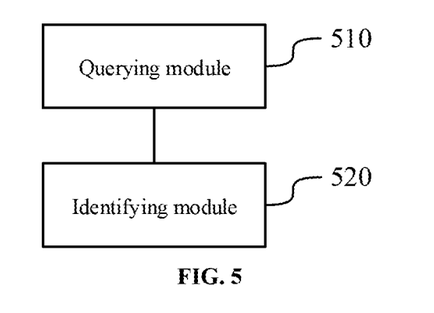
FIG. 5 is a schematic diagram of an apparatus for communication between a webpage and an operating system according to an exemplary embodiment of the present disclosure.

There is provided an apparatus for communication between a webpage and an operating system according to an exemplary embodiment of the present disclosure. The apparatus may be the above terminal. As shown in FIG. 5, the apparatus includes:

a querying module 510 configured to query a message in a clipboard; and an identifying module 520 configured to identify the message in the clipboard and processing a second message if the second message is identified, wherein the second message is communication information transmitted by a first object to the clipboard in a preset format that can be identified by the second object;

wherein the first object is different from the second object, and the first object and the second object are the webpage or the operating system.

Optionally, the identifying module 520 is configured to:

identify the message in the clipboard, and if a second message inserted with a preset sequence is identified, processing a second message inserted with a preset sequence.

Optionally, the identifying module 520 is configured to:

decode the message in the clipboard based on a preset decoding mode corresponding to the preset encoding mode and processing a second message if the second message is correctly decoded.

Optionally, when the first object is an operating system, and the querying module 510 is configured to:

query the message in the clipboard according to a preset query cycle.

Figure 6:
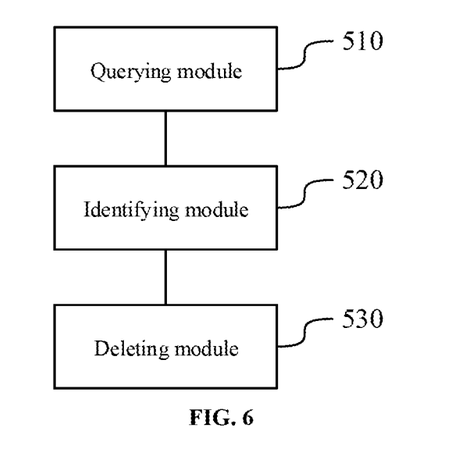
FIG. 6 is a schematic diagram of an apparatus for communication between a webpage and an operating system according to an exemplary embodiment of the present disclosure.

Optionally, as shown in FIG. 6, the apparatus further includes:

a deleting module 530 configured to delete the second message from the clipboard after processing the second message.

Figure 7:
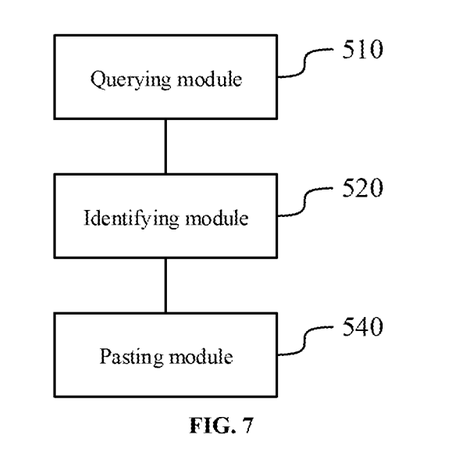
FIG. 7 is a schematic diagram of an apparatus for communication between a webpage and an operating system according to an exemplary embodiment of the present disclosure.

Optionally, as shown in FIG. 7, when the second object is an operating system, the apparatus further includes:

a pasting module 540 configured to paste a message other than the message in a preset format in the clipboard upon receiving a paste command.

Figure 8:
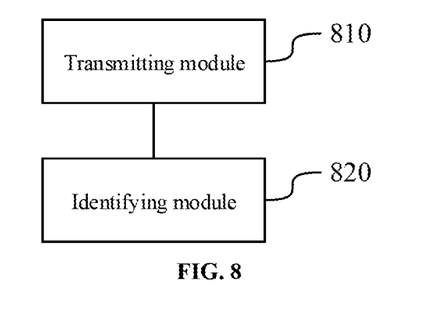
FIG. 8 is a schematic diagram of an apparatus for communication between a webpage and an operating system according to an exemplary embodiment of the present disclosure.

Based on the same technical concept, there is further provided an apparatus for communication between a webpage and an operating system according to an exemplary embodiment of the present disclosure. The apparatus may be the above-mentioned terminal. As shown in FIG. 8, the apparatus includes:

a transmitting module 810 configured to transmit a second message in a preset format to a clipboard through a first object; and an identifying module 820 configured to identify a message in the clipboard through a second object and processing the second message if the second message is identified, wherein the second message is communication information transmitted by the first object to the clipboard in a preset format that can be identified by the second object;

wherein the first object is different from the second object, and the first object and the second object are the webpage or the operating system.

Optionally, the transmitting module 810 is configured to:

transmit a second message inserted with a preset sequence to the clipboard through a first object; and identify, by a second object, a message in the clipboard and processing the second message if the second message is identified comprises:

identify a message in the clipboard through a second object and processing the second message inserted with a preset sequence if the second message is identified.

Optionally, the transmitting module 810 is configured to:

transmit a second message encoded by a preset encoding mode to the clipboard through the first object; and the identifying module 820 is configured to:

decode a message in the clipboard based on a preset decoding mode corresponding to the preset encoding mode through a second object, and processing the second message if the second message is correctly decoded.

Optionally, when the first object is an operating system and the second object is a webpage, the identifying module is configured to:

identify a message in the clipboard through the second object according to a preset query cycle.

Figure 9:
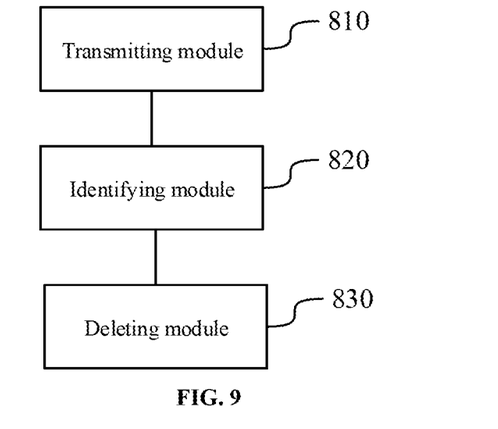
FIG. 9 is a schematic diagram of an apparatus for communication between a webpage and an operating system according to an exemplary embodiment of the present disclosure.

Optionally, as shown in FIG. 9, the apparatus further includes:

a deleting module 830 configured to delete the second message from the clipboard through the second object after processing the second message.

Figure 10:
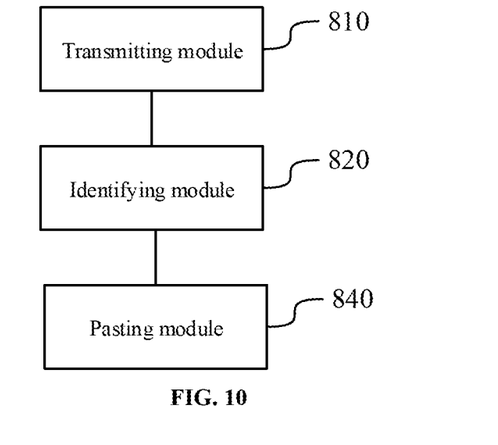
FIG. 10 is a schematic diagram of an apparatus for communication between a webpage and an operating system according to an exemplary embodiment of the present disclosure.

Optionally, as shown in FIG. 10, when the second object is an operating system, the apparatus further includes:

a pasting module 840 configured to paste a message other than the message in a preset format in the clipboard upon receiving a paste command.

With respect to the apparatus of the above embodiments, the specific method of operation performed by each module has been described in details in the embodiments of the method, and the description thereof may not be described in details herein.

In the embodiments of the present disclosure, a first object may acquire a first message that is communicated with a second object, and edit the first message into a second message in a preset format that can be identified by the second object, and further, may transmit the second message to a clipboard. Accordingly, the second object may query and identify the message in the clipboard. If the second message in a preset format and transmitted by the first object is identified, the second message may be processed. The first object is different from the second object. The first object or the second object may be a webpage or an operating system. In this way, the webpage and the operating system can communicate through the clipboard without calling a corresponding interface in the browser, thereby preventing the failure of the communication between the webpage and the operating system.

It should be noted that the apparatus for communication between a webpage and an operating system provided by the above embodiments is exemplified only by the above division of each of the functional modules when the communication between a webpage and an operating system is performed in the apparatus. In practice, the above-described functions may be assigned and completed by different functional modules in accordance with requirements, such that the internal structure of the prompt device can be divided into different functional modules to complete all or part of the functions described above. In addition, the apparatus for communication between a webpage and an operating system and the method for communication between a webpage and an operating system provided in the above embodiments follow the same principal, and the specific implementation process thereof can be described in the method embodiments and may not be described again hereto.

The embodiments of the present disclosure further show a schematic diagram of a structure of a terminal. The terminal may be a mobile phone and the like.

Figure 11:
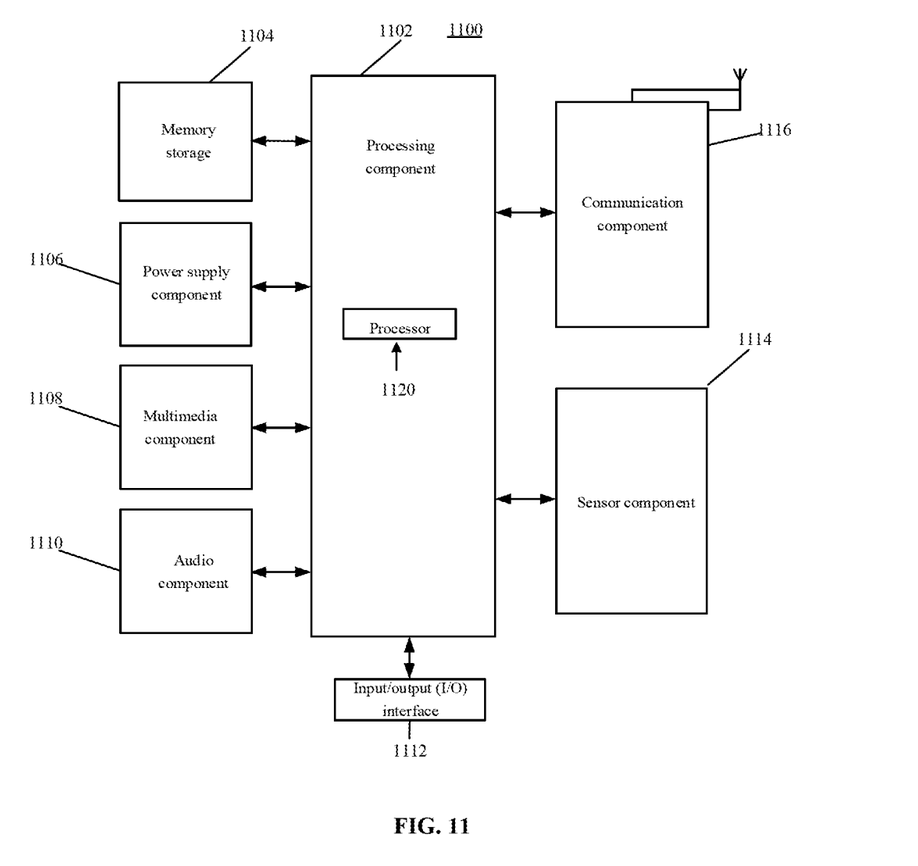
FIG. 11 is a schematic diagram of a structure of a terminal according to an exemplary embodiment of the present disclosure.

Referring to FIG. 11, the terminal 1100 may include one or more of the following components: a processing component 1102, a memory storage 1104, a power supply component 1106, a multimedia component 1008, an audio component 1110, an input/output (I/O) interface 1112, a sensor component 1114, and a communication component 1116.

The processing component 1102 generally can control the overall operation of the terminal 1100, such as operations associated with display, phone call, data communication, camera operation, and recording operation. The processing component 1102 may include one or more processors 1118 to execute instructions, to complete all or part of the steps described above. In addition, the processing component 1102 may include one or more modules to facilitate the interactions between the processing component 1102 and other components. For example, the processing component 1102 may include a multimedia module to facilitate interaction between the multimedia component 1108 and the processing component 1102.

The memory 1104 can be configured to store various types of data to support the operation of the terminal 1100. Examples of such data can include instructions of any application or method operating on the terminal 1100, contact data, phonebook data, messages, pictures, videos, and the like. The memory storage 1104 may be implemented by any type of volatile or nonvolatile memory device or a combination thereof, such as static random access memory (SRAM), electrically erasable programmable read only memory (EEPROM), erasable programmable read only memory (EPROM), programmable read only memory (PROM), read only memory (ROM), magnetic memory, flash memory, disk or CD.

The power supply component 1106 can provide power to the various components of the terminal 1100. The power supply component 1106 may include a power management system, one or more power supplies, and other components associated with generating, managing, and distributing power for the terminal 1100.

The multimedia component 1108 may include a screen providing an output interface between the terminal 1100 and the user. In some embodiments, the screen may include a liquid crystal display (LCD) and a touch panel (TP). If the screen includes a touch panel, the screen may be implemented as a touch screen to receive input signals from the user. The touch panel can include one or more touch sensors to sense touches, slides, and gestures on touch panels. The touch sensors may sense not only the boundary of the touch or slide actions, but also the duration and pressure associated with the touch or slide operation. In some embodiments, the multimedia component 1108 may include a front camera and/or a rear camera. When the terminal 1100 is at an operating mode, such as a shooting mode or a video mode, the front camera and/or the rear camera can receive external multimedia data. Each front camera and rear camera can be a fixed optical lens system or have focal length and optical zoom capability.

The audio component 1110 can be configured to output and/or input an audio signal. For example, the audio component 1110 can include a microphone (MIC) that is configured to receive external audio signals when the terminal 1100 is in the operating mode, such as a call mode, a recording mode, and a voice recognition mode. The received audio signals may be further stored in the memory 1104 or transmitted via the communication component 1116.

The I/O interface 1112 can provide the interface between the processing component 1102 and a peripheral interface module. The peripheral interface module may be a keyboard, a mouse, buttons, or the like. The buttons may include, but are not limited to, a home button, a volume button, a start button, and a lock button.

The sensor component 1114 may include one or more sensors for providing condition assessments of the various aspects of the terminal 1100. For example, the sensor component 1114 may detect the on/off state of the terminal 1100, the relative positioning of the components, such as the components can be the display and keypad of the terminal 1100, and the sensor component 1114 may also detect position changes of the terminal 1100 or any component thereof, presence or absence of the user contact with the terminal 1100, orientation, acceleration/deceleration, or the temperature changes of the terminal 1100. The sensor component 1114 may include a proximity sensor configured to detect the presence of a nearby object without any physical contact. The sensor component 1114 may also include a light sensor, such as a CMOS or CCD image sensor, for imaging applications. In some embodiments, the sensor component 1114 may also include acceleration sensors, gyro sensors, magnetic sensors, pressure sensors, or temperature sensors.

The communication component 1116 can be configured to facilitate wired or wireless communication between the terminal 1100, and other apparatuses. The terminal 1100, may access a wireless network based on a communication standard, such as WiFi, 2G or 3G, or a combination thereof. In an exemplary embodiment, the communication component 1116 can receive broadcast signals or broadcast-related information from an external broadcast management system via broadcast channels. In an exemplary embodiment, the communication component 1016 can also include a near field communication (NFC) module to facilitate short-range communication.

In an exemplary embodiment, the terminal 1100 may be implemented by one or more application specific integrated circuits (ASICs), digital signal processors (DSPs), digital signal processing devices (DSPDs), programmable logic devices (PLDs), field programmable gate array (FPGA), a controller, a microcontroller, a microprocessor, or other electronic components for performing the method described above.

In an exemplary embodiment, there is also provided a non-transitory computer readable storage medium comprising instructions, such as the memory 1104 including the instructions, the instructions may be executed by the processor 1120 of the terminal 1100 to complete the method described above. For example, the non-transitory computer readable storage medium may be a ROM, a random access memory (RAM), a CD-ROM, a magnetic tape, a floppy disk, an optical data storage device, etc.

There is provided a non-transitory computer-readable storage medium that, when instructions in the storage medium are executed by the processor of the terminal, causes the terminal to implement the method for communication between a webpage and an operating system. When the method is applied to a first object, the method includes:

acquiring a first message that is communicated with a second object and editing the first message into a second message in a preset format that can be identified by the second object; and transmitting the second message to a clipboard so that the second object acquires the second message through the clipboard;

wherein the first object is different from the second object, and the first object and the second object are the webpage or the operating system.

Optionally, editing the first message into a second message in a preset format that can be identified by the second object comprises:

inserting a preset sequence in the first message to acquire the second message in a preset format that can be identified by the second object.

Optionally, editing the first message into a second message in a preset format that can be identified by the second object comprises:

encoding the first message according to a preset encoding mode to acquire the second message in a preset format that can be identified by the second object.

Optionally, when the first object is an operating system, the method further comprises:

upon receiving a paste command, pasting a messages other than the message in a preset format in the clipboard.

Optionally, when the method is applied to a second object, the method includes:

querying a message in a clipboard; and identifying the message in the clipboard and processing a second message if the second message is identified, wherein the second message is communication information transmitted by a first object to the clipboard in a preset format that can be identified by the second object;

wherein the first object is different from the second object, and the first object and the second object are the webpage or the operating system.

Optionally, identifying the message in the clipboard and processing a second message if the second message is identified comprises:

identifying the message in the clipboard, and if a second message inserted with a preset sequence is identified, processing the second message.

Optionally, identifying the message in the clipboard, and if the second message is identified processing a second message comprises:

decoding the message in the clipboard based on a preset decoding mode corresponding to the preset encoding mode and processing a second message if the second message is correctly decoded.

Optionally, querying the message in the clipboard when the first object is an operating system and the second object is a webpage comprises:

querying the message in the clipboard according to a preset query cycle.

Optionally, the method further includes:

after processing the second message, deleting the second message from the clipboard.

Optionally, when the second object is an operating system, the method further comprises:

upon receiving a paste command, pasting other messages than the message in a preset format in the clipboard.

The method may further include:

transmitting a second message in a preset format to a clipboard through a first object; and identifying a message in the clipboard through a second object and processing the second message if the second message is identified, wherein the second message is communication information transmitted by the first object to the clipboard in a preset format that can be identified by the second object;

wherein the first object is different from the second object, and the first object and the second object are the webpage or the operating system.

Optionally, transmitting a second message in a preset format to a clipboard through a first object comprises:

transmitting a second message inserted with a preset sequence to the clipboard through a first object; and identifying a message in the clipboard through a second object and processing the second message if the second message is identified comprises:

identifying a message in the clipboard through a second object and processing the second message inserted with a preset sequence if the second message is identified.

Optionally, transmitting a second message in a preset format to a clipboard through a first object comprises:

transmitting a second message encoded by a preset encoding mode to the clipboard through a first object; and identifying a message in the clipboard through a second object and processing the second message if the second message is identified comprises:

decoding a message in the clipboard through a second object based on a preset decoding mode corresponding to the preset encoding mode and processing the second message if the second message is correctly decoded.

Optionally, identifying a message in the clipboard through a second object when the first object is an operating system and the second object is a webpage comprises:

identifying a message in the clipboard through a second object according to a preset query cycle.

Optionally, the method further includes:

deleting the second message from the clipboard through a second object after processing the second message.

when the second object is an operating system, the method further comprises:

upon receiving a paste command, pasting a message other than the message in a preset format in the clipboard.

In the embodiments of the present disclosure, a first object may acquire a first message that is communicated with a second object, and edit the first message into a second message in a preset format that can be identified by the second object, and further, may transmit the second message to a clipboard. Accordingly, the second object may query and identify the message in the clipboard. If the second message in a preset format and transmitted by the first object is identified, the second message may be processed. The first object is different from the second object. The first object or the second object may be a webpage or an operating system. In this way, the webpage and the operating system can communicate through the clipboard without calling a corresponding interface in the browser, thereby preventing a failure of communication between the webpage and the operating system.

It is noted that the various modules, submodules, units, subunits, and components in the present disclosure can be implemented using any suitable technology. For example, a module or a unit can be implemented using processing circuitry. In an example, a module or a unit can be implemented using integrated circuit (IC). In another example, a module or a unit can be implemented as a processor executing software instructions. In another example, interface circuitry is used to implement receiving unit (or module) and/or sending unit (or module).

Other embodiments of the present disclosure will be apparent to those skilled in the art from consideration of the specification and practice of the disclosure disclosed here. This application is intended to cover any variations, uses, or adaptations of the disclosure following the general principles thereof and including such departures from the present disclosure as come within known or customary practice in the art. It is intended that the specification and examples be considered as exemplary only, with a true scope and spirit of the present disclosure being indicated by the following claims.

It will be appreciated that the present disclosure is not limited to the exact structure that has been described above and illustrated in the accompanying drawings, and that various modifications and changes can be made without departing from the scope thereof. It is intended that the scope of the present disclosure only be limited by the appended claims.

What is claimed is:

1. A method for communication between a webpage that is accessed by a web browser executed on a device and an operating system executed on the device, comprising:
   executing a first software that provides the operating system including a clipboard;
   executing a second software that causes the web browser to browse the webpage that accesses the clipboard;
   detecting a message that is buffered in the clipboard provided by the operating system;
   determining one of the first software and the second software as a destination software for the message based on a format detection of the message;
   processing the message by the destination software;
   executing the second software that accesses the clipboard according to a preset cycle time to detect messages buffered in the clipboard;
   deleting the message from the clipboard after the message has been processed; and
   in response to a paste command, pasting another message in a different format from a preset format associated with the operating system from the clipboard.

2. The method according to claim 1, wherein the destination software is executed by a processing circuitry of the device and is one of the web browser that accesses the webpage and the operating system.

3. The method according to claim 1, wherein determining the destination software comprises:
   detecting, from the message, a preset sequence that is associated with the destination software.

4. The method according to claim 1, wherein determining the destination software comprises:
   decoding the message based on a preset decoding mode associated with the destination software; and
   determining the destination software being the destination when the message is correctly decoded.

5. An apparatus, comprising:
   memory circuitry configured to store a first software for an operating system and a second software for a web browser; and
   processing circuitry configured to:
      execute the first software that provides the operating system including a clipboard;
      execute the second software that causes the web browser to browse a webpage that accesses the clipboard;
      detect a message that is buffered in the clipboard;
      determine one of the first software and the second software as a destination software for the message based on a format detection of the message;
      process the message by the destination software;
      execute the second software that accesses the clipboard according to a preset cycle time to detect messages buffered in the clipboard;
      delete the message from the clipboard after the message has been processed; and
      execute the first software to paste another message in a different format from the first preset format from the clipboard in response to a paste command.

6. The apparatus according to claim 5, wherein the processing circuitry is configured to:
   execute the first software to detect whether the message is in a first format associated with the operating system; and
   execute the second software to detect whether the message is in a second format associated with the webpage.

7. The apparatus according to claim 6, wherein the processing circuitry is configured to:
   execute the first software to detect whether the message incudes a first preset sequence associated with the operating system; and
   execute the second software to detect whether the message includes a second preset sequence associated with the webpage.

8. The apparatus according to claim 6, wherein the processing circuitry is configured to:
   execute the first software to decode the message based on a first preset decoding mode associated with the operating system; and
   execute the second software to decode the message based on a second preset decoding mode associated with the webpage.

9. A non-transitory computer-readable medium storing instructions which when executed by a computer cause the computer to perform:
   executing a first software that provides an operating system including a clipboard;
   executing a second software that causes a web browser to browse a webpage that accesses the clipboard;
   detecting a message that is buffered in the clipboard;
   determining one of the first software and the second software as a destination software for the message based on a format detection of the message;
   processing the message by the destination software;
   executing the second software that accesses the clipboard according to a preset cycle time to detect messages buffered in the clipboard;
   deleting the message from the clipboard after the message has been processed; and
   in response to a paste command, pasting another message in a different format from a preset format associated with the operating system from the clipboard.

10. The non-transitory computer-readable medium according to claim 9, wherein the instructions cause the computer to further perform:
   executing the first software to detect whether the message is in a first format associated with the operating system; and executing the second software to detect whether the message is in a second format associated with the webpage.

11. The non-transitory computer-readable medium according to claim 10, wherein the instructions cause the computer to further perform:

executing the first software to detect whether the message incudes a first preset sequence associated with the operating system; and executing the second software to detect whether the message includes a second preset sequence associated with the webpage.

12. The non-transitory computer-readable medium according to claim 10, wherein the instructions cause the computer to further perform:

executing the first software to decode the message based on a first preset decoding mode associated with the operating system; and executing the second software to decode the message based on a second preset decoding mode associated with the webpage.

\* \* \* \* \*